US009893561B2

(12) United States Patent
Niu et al.

(10) Patent No.: US 9,893,561 B2
(45) Date of Patent: Feb. 13, 2018

(54) POWER SUPPLY CONVERSION SYSTEM AND METHOD OF CONTROLLING THE SAME

(71) Applicant: Delta Electronics, Inc., Taoyuan County (TW)

(72) Inventors: Hsin-Chung Niu, Taoyuan County (TW); Yuan-Sheng Lee, Taoyuan County (TW); Po-Wen Hsueh, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 715 days.

(21) Appl. No.: 14/228,369

(22) Filed: Mar. 28, 2014

(65) Prior Publication Data

US 2015/0069842 A1    Mar. 12, 2015

(30) Foreign Application Priority Data

Sep. 6, 2013  (TW) .............................. 102132156 A

(51) Int. Cl.
*H02J 9/00* (2006.01)
*H02J 7/00* (2006.01)
(Continued)

(52) U.S. Cl.
CPC .............. *H02J 9/061* (2013.01); *G05F 1/563* (2013.01); *H02H 3/08* (2013.01); *H02H 9/02* (2013.01); *Y10T 307/615* (2015.04)

(58) Field of Classification Search
CPC ............ G05F 1/565; G05F 1/563; G05F 1/00; H02H 3/08; H02H 9/02; B60T 8/88
(Continued)

(56) References Cited

U.S. PATENT DOCUMENTS 5,747,887 A *  5/1998  Takanaga .................. H02J 3/28
                                                    307/44
6,169,667 B1 *  1/2001  Liu .................... H02M 3/33561
                                                    363/17
(Continued)

FOREIGN PATENT DOCUMENTS

CN        103248111      8/2013
TW          I343162      6/2011
TW        201320140      5/2013

OTHER PUBLICATIONS

Office Action dated Feb. 13, 2015 from corresponding application No. TW 102132156.
(Continued)

*Primary Examiner* — Rexford Barnie
*Assistant Examiner* — Jagdeep Dhillon
(74) *Attorney, Agent, or Firm* — Hauptman Ham, LLP

(57) ABSTRACT

A power supply conversion system receives an external power source to supply power to a load. The power supply conversion system includes at least one main power apparatus, at least one auxiliary power apparatus, a main switch, an auxiliary switch, and a control unit. The control unit turns on the main switch to restore the external power source when the control unit detects that the external power source is normally restored, and jointly supply power to the load with the auxiliary power apparatus. Especially, the output voltage of the main power apparatus is greater than the output voltage of the auxiliary power apparatus. In addition, the control unit disconnects the auxiliary power apparatus supplying power to the load when the control unit detects that the main power apparatus completely supplies power to the load.

20 Claims, 6 Drawing Sheets

(51) Int. Cl.
*H02J 9/06* (2006.01)
*G05F 1/563* (2006.01)
*H02H 9/02* (2006.01)
*H02H 3/08* (2006.01)

(58) Field of Classification Search
USPC ....... 307/31, 64, 43, 66, 82, 80; 303/122.04, 303/122.03, 122.05; 399/88; 361/93.7, 361/93.9
See application file for complete search history.

(56) References Cited

U.S. PATENT DOCUMENTS

| | | | | |
|---|---|---|---|---|
| 7,485,988 B2* | 2/2009 | Lin | ......................... | H02J 9/061 307/64 |
| 7,671,487 B2* | 3/2010 | Wang | ...................... | H02J 9/062 307/64 |
| 7,723,866 B2* | 5/2010 | Chang | ..................... | G06F 1/263 307/64 |
| 8,860,251 B2 | 10/2014 | Lin et al. | | |
| 2003/0030322 A1* | 2/2003 | Yokoyama | ............ | B60T 8/3255 303/122.04 |
| 2007/0115695 A1* | 5/2007 | Lou | ..................... | H02M 3/1582 363/16 |
| 2007/0280720 A1* | 12/2007 | Kimura | .................. | G03G 15/80 399/88 |
| 2008/0304198 A1* | 12/2008 | Chishima | ............... | H02H 3/087 361/93.7 |
| 2013/0043727 A1* | 2/2013 | Liu | .......................... | G06F 1/26 307/31 |
| 2014/0009978 A1* | 1/2014 | Brinlee | ............... | H02M 1/4225 363/25 |
| 2014/0169049 A1* | 6/2014 | Chandrasekaran | . | H02M 1/4225 363/84 |
| 2015/0188445 A1* | 7/2015 | Tsutsui | .................... | H02H 3/08 363/37 |

OTHER PUBLICATIONS

Office Action dated Feb. 16, 2016 from corresponding application No. CN 201310403869.6.

* cited by examiner

POWER SUPPLY CONVERSION SYSTEM AND METHOD OF CONTROLLING THE SAME

BACKGROUND

1. Technical Field

The present disclosure relates generally to a power supply conversion system and a method of controlling the same, and more particularly to a power supply conversion system and a method of controlling the same to implement soft and smooth switching power supply conversion.

2. Description of Related Art

In order to maintain stability and reliability of supplying power when the power source is abnormally interrupted or unstable, the backup power is necessary besides the main power source so as to take responsibility of temporarily supplying power and continually supply power to the load. When the main power source, usually the AC utility is provided, normally supplies power, the main power source supplies power to the load. Simultaneously, the main power source charges the backup power, usually the rechargeable battery is provided, so as to continually provide power to the load when the main power source abnormally supplies power. In addition, the main power source takes responsibility of supplying power to the load again when the main power source is restored to normally supply power.

In the actual operations, the inrush current is generated to cause voltage dip of the power source when the backup power is disconnected and the main power source is instantaneously restored. Further, the conditions of shut down, re-boosting, re-bounce, and damage of the power supply conversion system usually occur.

Accordingly, it is desirable to provide a power supply conversion system and a method of controlling the same to implement soft and smooth switching power supply conversion so as to increase stability and reliability of power supply, restrain inrush current, increase use life of the system, and increase robustness of supplying power to the load.

SUMMARY

An object of the present disclosure is to provide a power supply conversion system to solve the above-mentioned problems. Accordingly, the power supply conversion system receives an external power source and supplies power to a load. The power supply conversion system includes at least one main power apparatus, at least one auxiliary power apparatus, a main switch, an auxiliary switch, and at least one control unit. The main switch is connected between the external power source and the main power apparatus. The auxiliary switch is connected between the auxiliary power apparatus and the load. The at least one control unit is connected to the at least one main power apparatus and the at least one auxiliary power apparatus. The control unit turns on the main switch when the control unit detects that the external power source normally supplies power so that the main power apparatus receives the external power source and converts the external power source to supply power to the load. The control unit turns off the main switch when the control unit detects that the external power source abnormally supplies power so that the external power source is disconnected to supply power to the load and the auxiliary power apparatus supplies power to the load. The control unit turns on the main switch to restore the external power source so that the main power apparatus and the auxiliary power apparatus jointly supply power to the load when the control unit detects that the external power source is restored to normally supply power, wherein the control unit controls that the output voltage of the main power apparatus is greater than the output voltage of the auxiliary power apparatus. The control unit disconnects the auxiliary power apparatus supplying power to the load when the control unit detects that the main power apparatus completely and fully supplies power to the load.

Another object of the present disclosure is to provide a method of controlling a power supply conversion system to solve the above-mentioned problems. The power supply conversion system receives an external power source and supplies power to a load. The power supply conversion system has at least one main power apparatus, at least one auxiliary power apparatus, and at least one control unit. The method comprising following steps: (a) receiving the external power source and converting the external power source to supply power to the load by the main power apparatus when the control unit detects that the external power source normally supplies power; (b) disconnecting the external power source and switching the auxiliary power apparatus to supply power to the load by the control unit when the control unit detects that the external power source abnormally supplies power; (c) restoring the external power source by the control unit and jointly supplying power to the load by the main power apparatus and the auxiliary power apparatus when the control unit detects that the external power source is normally restored; wherein the control unit controls that the output voltage of the main power apparatus is greater than the output voltage of the auxiliary power apparatus; (d) disconnecting the auxiliary power apparatus supplying power to the load when the control unit detects that the main power apparatus completely and fully supplies power to the load.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
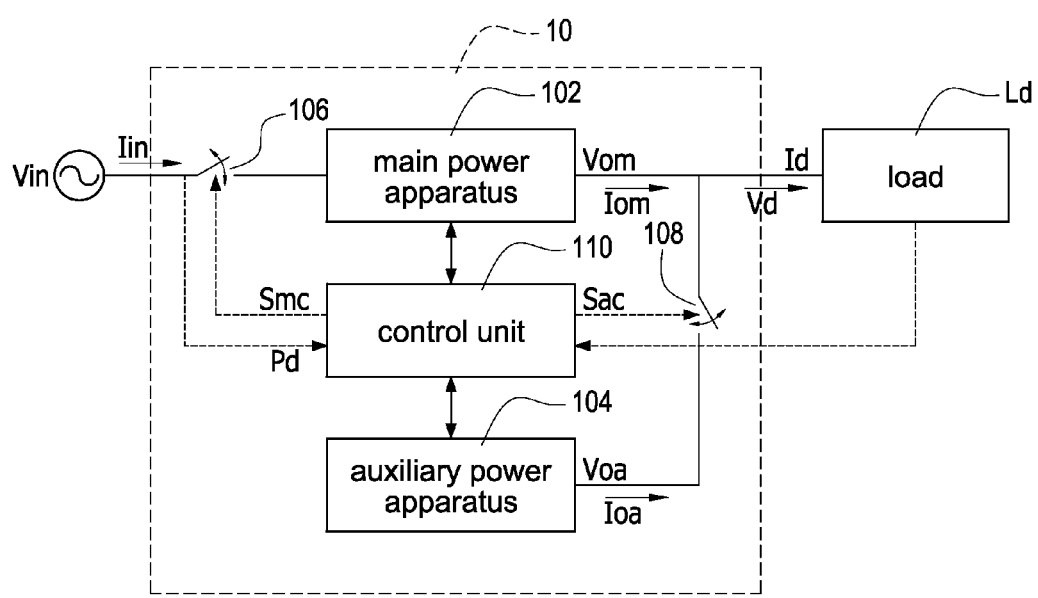
FIG. 1 is a schematic block diagram of a power supply conversion system according to a first embodiment of the present disclosure.

Reference will now be made to the drawing figures to describe the present invention in detail.

Reference is made to FIG. 1 which is a schematic block diagram of a power supply conversion system according to a first embodiment of the present disclosure. The power supply conversion system 10 receives an external power source Vin and supplies power to a load Ld. The power supply conversion system 10 includes at least one main power apparatus 102, at least one auxiliary power apparatus 104, a main switch 106, an auxiliary switch 108, and at least one control unit 110. The main switch 106 is connected between the external power source Vin and the at least one main power apparatus 102. The auxiliary switch 108 is connected between the at least one auxiliary power apparatus 104 and the load Ld. In particular, the main switch 106 or the auxiliary switch 108 can be a circuit breaker or a power switch, but not limited. However, the embodiments are only exemplified but are not intended to limit the scope of the present disclosure. The control unit 110 is connected to the main power apparatus 102 and the auxiliary power apparatus 104, and the control unit 110 receives a power source detection signal Pd to detect whether the external power source Vin normally supplies power or not. In addition, the external power source Vin is an AC power source or a DC power source. For convenience, the AC power source is exemplified as the external power source Vin to further demonstrate the present disclosure.

When the control unit 110 detects that the external power source Vin normally supplies power, the control unit 110 outputs a main switch control signal Smc to turn on the main switch 106. In particular, the main switch control signal Smc can be high-level to turn on the main switch 106, but not limited. Therefore, the main power apparatus 102 receives the external power source Vin and converts the external power source Vin to supply power to the load Ld. At the same time, the control unit 110 also outputs an auxiliary switch control signal Sac to turn off the auxiliary switch 108. In particular, the auxiliary switch control signal Sac can be low-level to turn off auxiliary switch 108, but not limited. In other words, when the control unit 110 detects that the external power source Vin normally supplies power, the control unit 110 outputs the high-level main switch control signal Smc and the main power apparatus 102 converts the external power source Vin into the required voltage level to the load Ld.

When the control unit 110 detects that the external power source Vin abnormally supplies power, the control unit 110 outputs the main switch control signal Smc to turn off the main switch 106 so that the external power source Vin is disconnected to supply power to the load Ld. In particular, the main switch control signal Smc can be low-level to turn off the main switch 106, but not limited. At the same time, the control unit 110 also outputs the auxiliary switch control signal Sac to turn on the auxiliary switch 108 so that the auxiliary power apparatus 104 is switched to supply power to the load Ld. In particular, the auxiliary switch control signal Sac can be high-level to turn on auxiliary switch 108, but not limited. Especially, "the external power source Vin abnormally supplies power" means that the external power source Vin cannot normally provide power because of failure, malfunction, repair of the external power source Vin.

When the control unit 110 detects that the external power source Vin is restored to normally supply power, the control unit 110 outputs the high-level main switch control signal Smc again to turn on the main switch 106 so that the external power source Vin is restored to supply power to the load Ld. Especially, the main power apparatus 102 and the auxiliary power apparatus 104 jointly supply power to the load Ld. At this time, the main switch 106 and the auxiliary switch 108 are simultaneously turned on. In this operation, the control unit 110 controls that the output voltage Vom of the main power apparatus 102 is greater than the output voltage Voa of the auxiliary power apparatus 104. Accordingly, the main power apparatus 102 gradually increases the output power to supply the load Ld but the auxiliary power apparatus 104 gradually decreases the output power to supply the load Ld when the main power apparatus 102 and the auxiliary power apparatus 104 jointly supply power to the load Ld. That is, the output current Iom of the main power apparatus 102 gradually increases and the output current Ioa of the auxiliary power apparatus 104 gradually decreases. Finally, the control unit 110 outputs the low-level auxiliary switch control signal Sac again to turn off the auxiliary switch 108 so that the auxiliary power apparatus 104 is disconnected to supply power to the load Ld when the control unit 110 detects that the main power apparatus 102 completely and fully supplies power to the load Ld.

Figure 2:
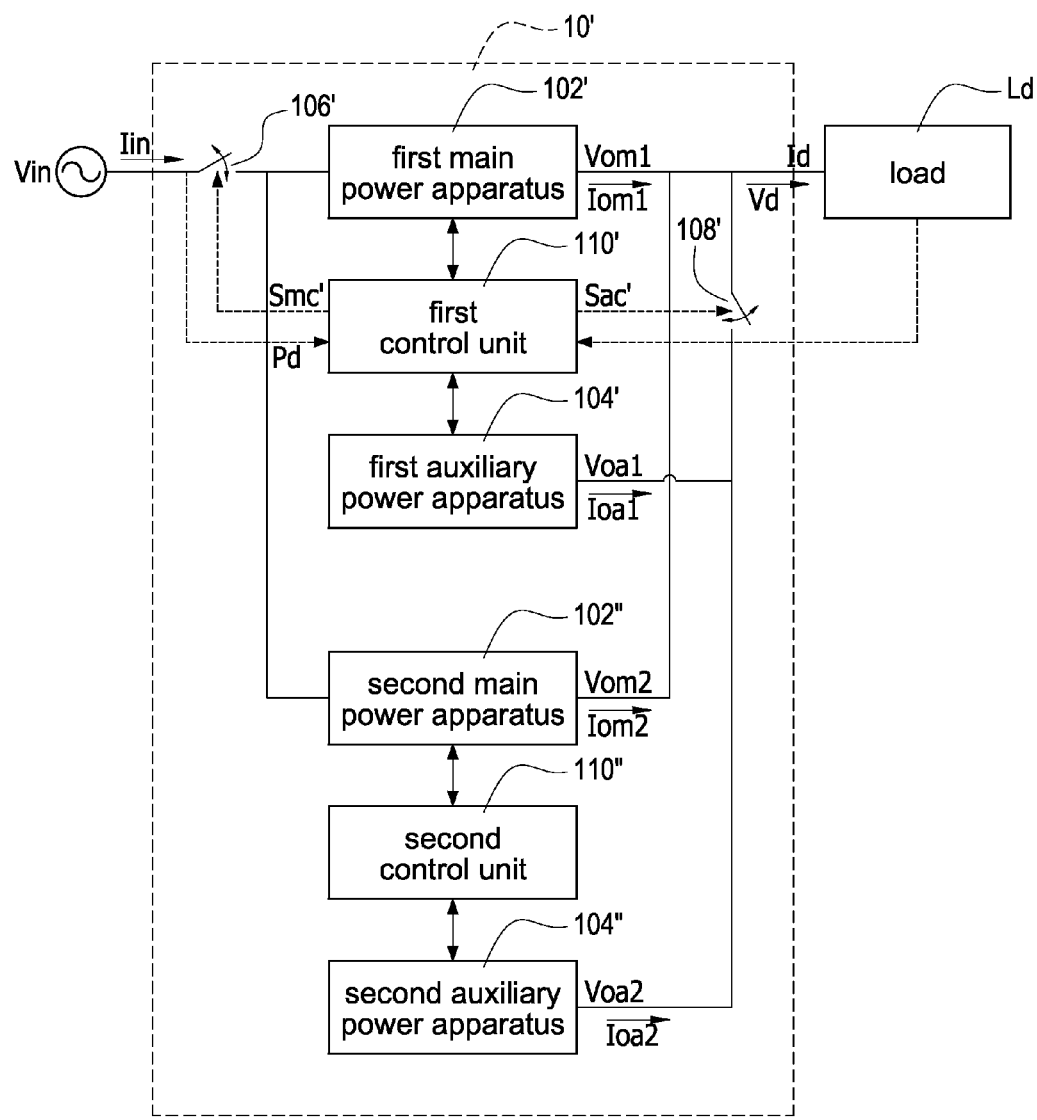
FIG. 2 is a schematic block diagram of the power supply conversion system according to a second embodiment of the present disclosure.

Reference is made to FIG. 2 which is a schematic block diagram of the power supply conversion system according to a second embodiment of the present disclosure. The major difference between the second embodiment and the first embodiment is that the power supply conversion system 10' of the second embodiment has a plurality of main power apparatuses, auxiliary power apparatuses, and control units. For convenience, two main power apparatuses, two auxiliary power apparatuses, and two control units are exemplified to further demonstrate the present disclosure. That is, the power supply conversion system 10' has a first main power apparatus 102', a first auxiliary power apparatus 104', a first control unit 110', a second main power apparatus 102", a second auxiliary power apparatus 104", a second control unit 110", a main switch 106', and an auxiliary switch 108'. Especially, one main power apparatus, one auxiliary power apparatus, and one control unit are formed in one group in the second embodiment. That is, the first control unit 110' is operated correspondingly to the first main power apparatus 102' and the first auxiliary power apparatus 104'; the second control unit 110" is operated correspondingly to the second main power apparatus 102" and the second auxiliary power apparatus 104". In addition, the main switch 106' and the auxiliary switch 108' can be controlled by a main switch control signal Smc' and an auxiliary switch control signal Sac' produced from the first control unit 110'; or the main switch 106' and the auxiliary switch 108' can be controlled by a main switch control signal Smc' and an auxiliary switch control signal Sac' produced from the second control unit 110". The power supply conversion system 10' with multiple main power apparatuses, auxiliary power apparatuses, and control units is provided to supply more power to the load Ld, thus increasing stability and reliability of power supply.

Because the operation of the power supply conversion system 10' is similar to that of the power supply conversion system 10, the first control unit 110' is exemplified as main control unit to further demonstrate the present disclosure. In addition, the second control unit 110" can also provide the same operation; however, the embodiment is only exemplified but is not intended to limit the scope of the present disclosure. When the first control unit 110' detects that the external power source Vin normally supplies power, the first control unit 110' outputs the high-level main switch control signal Smc' to turn on the main switch 106' so that the external power source Vin is simultaneously received and converted by the first main power apparatus 102' and the second main power apparatus 102" to supply power to the load Ld. In other words, the first main power apparatus 102' and the second main power apparatus 102" are connected in parallel to supply power to the load Ld.

When the first control unit 110' detects that the external power source Vin abnormally supplies power, the first control unit 110' outputs the main switch control signal Smc' to turn off the main switch 106' so that the external power source Vin is disconnected to supply power to the load Ld. At the same time, the first control unit 110' also outputs the high-level auxiliary switch control signal Sac' to turn on the auxiliary switch 108' so that the first auxiliary power apparatus 104' and the second auxiliary power apparatus 104" are switched to jointly supply power to the load Ld. In other words, the first auxiliary power apparatus 104' and the second auxiliary power apparatus 104" are connected in parallel to supply power to the load Ld.

When the first control unit 110' detects that the external power source Vin is restored to normally supply power, the first control unit 110' outputs the high-level main switch control signal Smc' again to turn on the main switch 106' so that the external power source Vin is restored to supply power to the load Ld. Especially, the first main power apparatus 102' and the first auxiliary power apparatus 104', and the second main power apparatus 102" and the second auxiliary power apparatus 104" jointly supply power to the load Ld. At this time, the main switch 106' and the auxiliary switch 108' are simultaneously turned on. In this operation, the first control unit 110' controls that the output voltage Vom1 of the first main power apparatus 102' is greater than the output voltage Voa' of the first auxiliary power apparatus 104', and controls that the output voltage Vom2 of the second main power apparatus 102" is greater than the output voltage Voa" of the second auxiliary power apparatus 104". Accordingly, the first main power apparatus 102' and the second main power apparatus 102" gradually increase the output power to supply the load Ld but the first auxiliary power apparatus 104' and the second auxiliary power apparatus 104" gradually decrease the output power to supply the load Ld when the first main power apparatus 102', the second main power apparatus 102", the first auxiliary power apparatus 104', and the second auxiliary power apparatus 104" jointly supply power to the load Ld. That is, the output current Iom1 of the first main power apparatus 102' and the output current Iom2 of the second main power apparatus 102" gradually increase, and the output current Ioa1 of the first auxiliary power apparatus 104' and the output current Ioa2 of the second auxiliary power apparatus 104" gradually decrease. Finally, the first control unit 110' outputs the low-level auxiliary switch control signal Sac' again to turn off the auxiliary switch 108' so that the first auxiliary power apparatus 104' and the second auxiliary power apparatus 104" are disconnected to supply power to the load Ld when the first control unit 110' detects that the first main power apparatus 102' and the second main power apparatus 102" completely and fully supply power to the load Ld.

Figure 3:
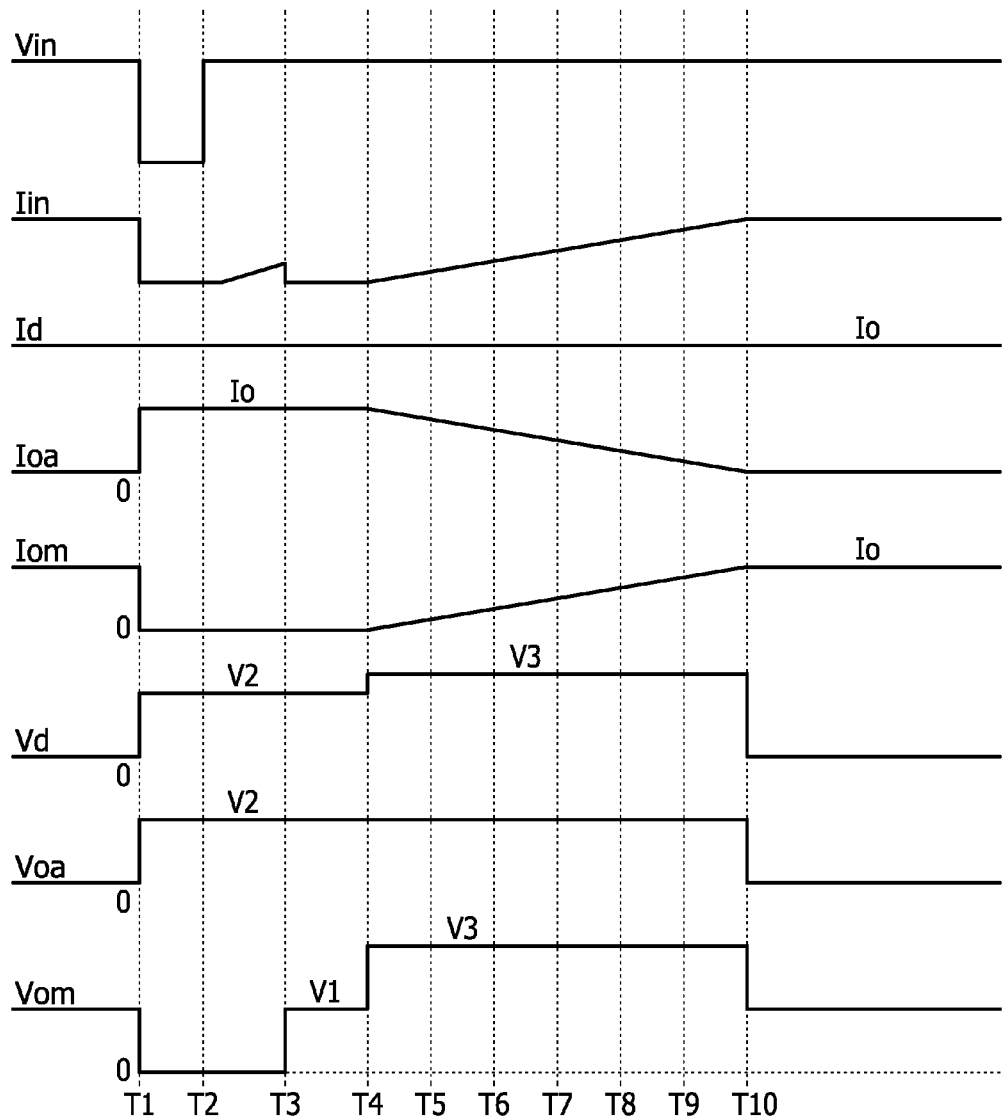
FIG. 3 is a timing diagram of controlling the power supply conversion system according to the present disclosure.

Reference is made to FIG. 3 which is a timing diagram of controlling the power supply conversion system according to the present disclosure. In this embodiment, one main power apparatus 102, one auxiliary power apparatus 104, and one control unit 110 are exemplified to further demonstrate the present disclosure. The waveform graphs from top to bottom show statuses of the voltage of the external power source Vin, the current of the external power source Iin, the current of the load Id, the current of the auxiliary power apparatus Ioa, the current of the main power apparatus, the voltage of the load Vd, the voltage of the auxiliary power apparatus Voa, and the voltage of the main power apparatus Vom, respectively. In particular, the waveform graphs are schematic to electrical parameters of the apparatuses but not the actual values of the electrical parameters.

Refer to FIG. 1 again, before the first time point T1, the control unit 110 detects that the external power source Vin normally supplies power, the control unit 110 turns on the main switch 106 so that the main power apparatus 102 receives the external power source Vin and converts the external power source Vin to supply power to the load Ld. In other words, when the external power source Vin normally supplies power, the main power apparatus 102 takes responsibility of supplying power to the load Ld, and the auxiliary power apparatus 104 provides the backup power to the load Ld. At the first time point T1, the control unit 110 detects that the external power source Vin abnormally supplies power, the control unit 110 turns off the main switch 106 so that the external power source Vin is disconnected to supply power to the load Ld. At the same time, the auxiliary power apparatus 104 is switched to play a role of supplying power to the load Ld. In other words, when the external power source Vin abnormally supplies power, the auxiliary power apparatus 104 takes responsibility of supplying power to the load Ld. At this time, the main power apparatus 102 does not provide the system loading and the external power source Vin can be repaired or maintained.

It is assumed that the control unit 110 detects that the external power source Vin is restored to normally supply power at the second time point T2, the control unit 110 turns on the main switch 106 so that the main power apparatus 102 receives the external power source Vin. At the third time point T3, the build-up of voltage of the main power apparatus 102 is achieved to provide output voltage to the load Ld. Especially, at this time, the main power apparatus 102 and the auxiliary power apparatus 104 jointly supply power to the load Ld.

At the fourth time point T4, the control unit 110 controls that the output voltage Vom of the main power apparatus 102 is greater than the output voltage Voa of the auxiliary power apparatus 104. In other words, at the fourth time point T4, the output voltage Vom of the main power apparatus 102 is increased from a first voltage V1 to a third voltage V3, and the output voltage Voa of the auxiliary power apparatus 104 keeps at a second voltage V2. In particular, the third voltage V3 is greater than the second voltage V2. Because the output voltage Vom of the main power apparatus 102 is greater than the output voltage Voa of the auxiliary power apparatus 104, the main power apparatus 102 gradually increases the output power to supply the load Ld but the auxiliary power apparatus 104 gradually decreases the output power to supply the load Ld when the main power apparatus 102 and the auxiliary power apparatus 104 jointly supply power to the load Ld. It is assumed that the total system loading is constant. When the output current Iom of the main power apparatus 102 gradually increases but the output current Ioa of the auxiliary power apparatus 104 gradually decreases, the system loading supplied from the main power apparatus 102 gradually increases but the system loading supplied from the auxiliary power apparatus 104 gradually decreases. The time interval from the fourth time point T4 to the tenth time point T10 indicates the time of jointly supplying power to the load Ld by the main power apparatus 102 and the auxiliary power apparatus 104. During the time interval, the output current Iom of the main power apparatus 102 gradually increases and the output current Ioa of the auxiliary power apparatus 104 gradually decreases.

Finally, the control unit 110 controls that the auxiliary power apparatus 104 is disconnected to supply power to the load Ld when the control unit 110 detects that the main power apparatus 102 completely and fully supplies power to the load Ld at the tenth time point T10.

Accordingly, the strategy of controlling the power supply conversion system has following features:

1. By extending the time of jointly supplying power to the load Ld by the main power apparatus 102 and the auxiliary power apparatus 104, that is, the time is also called an energy switching area which is from the fourth time point T4 to the tenth time point T10, the soft and smooth switching power supply conversion between the main power apparatus 102 and the auxiliary power apparatus 104 is implemented. In the energy switching area, the main power apparatus 102 gradually increases the output power to supply the load Ld but the auxiliary power apparatus 104 gradually decreases the output power to supply the load Ld. Hence, the inrush current generated because of instantaneously disconnecting the auxiliary power apparatus 104 and switching the main power apparatus 102 to supply to the load Ld can be restrained to avoid the voltage dip of the input power source. Further, the conditions of shut down, re-boosting, re-bounce, and damage of the power supply conversion system can be also overcome.

2. By gradually increasing output current of the main power apparatus 102 and decreasing output current of the auxiliary power apparatus 104 in a linear and time-varying control manner, the soft and smooth switching power supply conversion between the main power apparatus 102 and the auxiliary power apparatus 104 is implemented. The control unit 110 controls the main power apparatus gradually increasing fixed percentage of supplying power to the load Ld in the energy switching area, such as from 0% to 100% correspondingly from the fourth time point T4 to the tenth time point T10. That is, 14.29% increment of output power of the main power apparatus 102 in each time interval is provided, thus softly and smoothly switching the main power apparatus 102 to supply power to the load Ld. However, the embodiment is only exemplified but is not intended to limit the scope of the present disclosure. That is, the energy switching area can be extended (from the fourth time point T4 to the tenth time point T10 is not limited) according to the actual requirements of jointly supplying power by the main power apparatus 102 and the auxiliary power apparatus 104, thus increasing robustness of supplying power to the load Ld.

Figure 4:
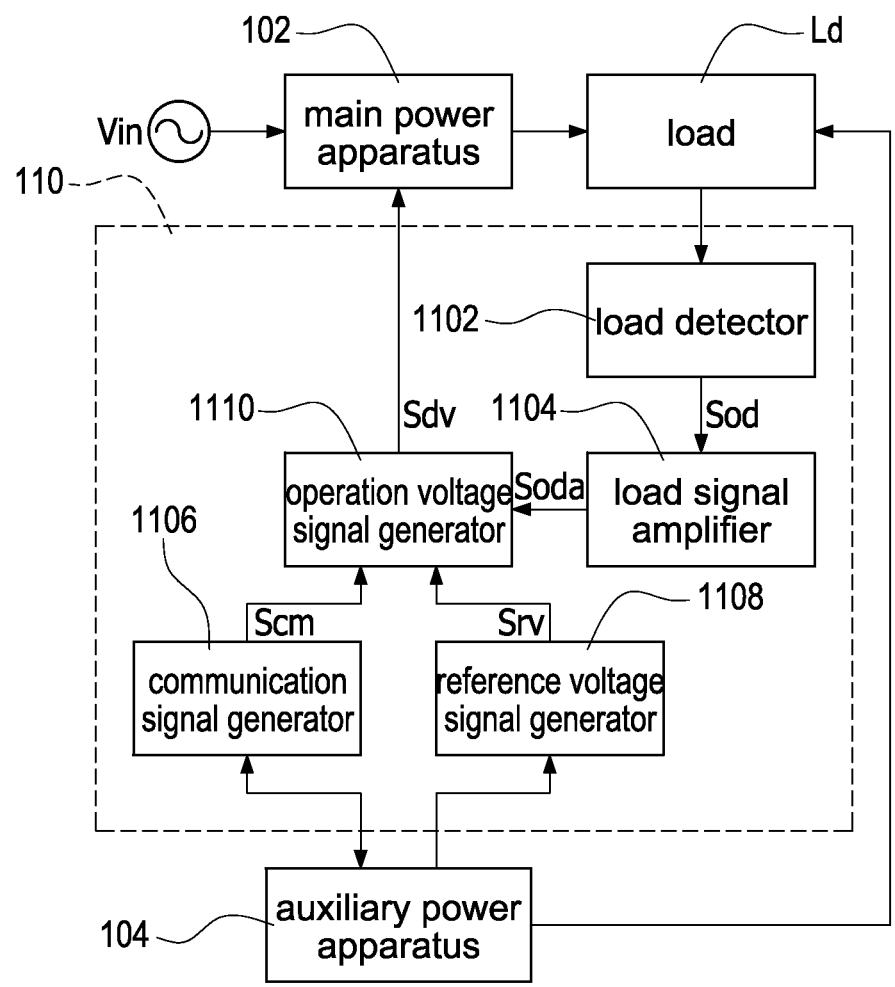
FIG. 4 is a schematic block diagram of the power supply conversion system according to a third embodiment of the present disclosure.

Reference is made to FIG. 4 which is a schematic block diagram of the power supply conversion system according to a third embodiment of the present disclosure. Especially, the FIG. 4 shows that the power supply conversion system 10 is operated in the energy switching area, that is, the main switch 106 and the auxiliary switch 108 are turned on. In this embodiment, the control unit 110 includes a load detector 1102, a load signal amplifier 1104, a communication signal generator 1106, a reference voltage signal generator 1108, and an operation voltage signal generator 1110. The load detector 1102 is connected to the load Ld to detect conditions of the load Ld. More specifically, the load detector 1102 detects the required total system loading of the load Ld and outputs a load signal Sod. The load signal amplifier 1104 receives the load signal Sod and amplifies the load signal Sod to output a load amplifying signal Soda. The communication signal generator 1106 is connected to provide communication between the main power apparatus 102 and the auxiliary power apparatus 104. More specifically, the communication signal generator 1106 is provided to communicate the system loading of the load Ld to the main power apparatus 102 and the auxiliary power apparatus 104 when the main power apparatus 102 and the auxiliary power apparatus 104 jointly supply power to the load Ld so as to ensure softly and smoothly switching the main power apparatus 102 to supply power to the load Ld. The communication signal generator 1106 detects power supply conditions of the auxiliary power apparatus 104 and outputs a communication signal Scm. The reference voltage signal generator 1108 is connected to the auxiliary power apparatus 104 to detect the auxiliary power apparatus 104 and outputs a reference voltage signal Srv so as to control the output voltage of the main power apparatus 102 is greater than the output voltage of the auxiliary power apparatus 104. The operation voltage signal generator 1110 is connected to the load signal amplifier 1104, the communication signal generator 1106, and the reference voltage signal generator 1108 and receives the load amplifying signal Soda, the communication signal Scm, and the reference voltage signal Srv, respectively. The operation voltage signal generator 1110 acquires the total system loading of the load Ld according to the load amplifying signal Soda, acquires power supply conditions of the auxiliary power apparatus 104 according to the communication signal Scm, and acquires output voltage of the auxiliary power apparatus 104, thus outputting an operation voltage signal Sdv to control the output voltage of the main power apparatus 102. Accordingly, the main power apparatus 102 gradually increases the output power to supply the load Ld but the auxiliary power apparatus 104 gradually decreases the output power to supply the load Ld when the main power apparatus 102 and the auxiliary power apparatus 104 jointly supply power to the load Ld.

Figure 5:
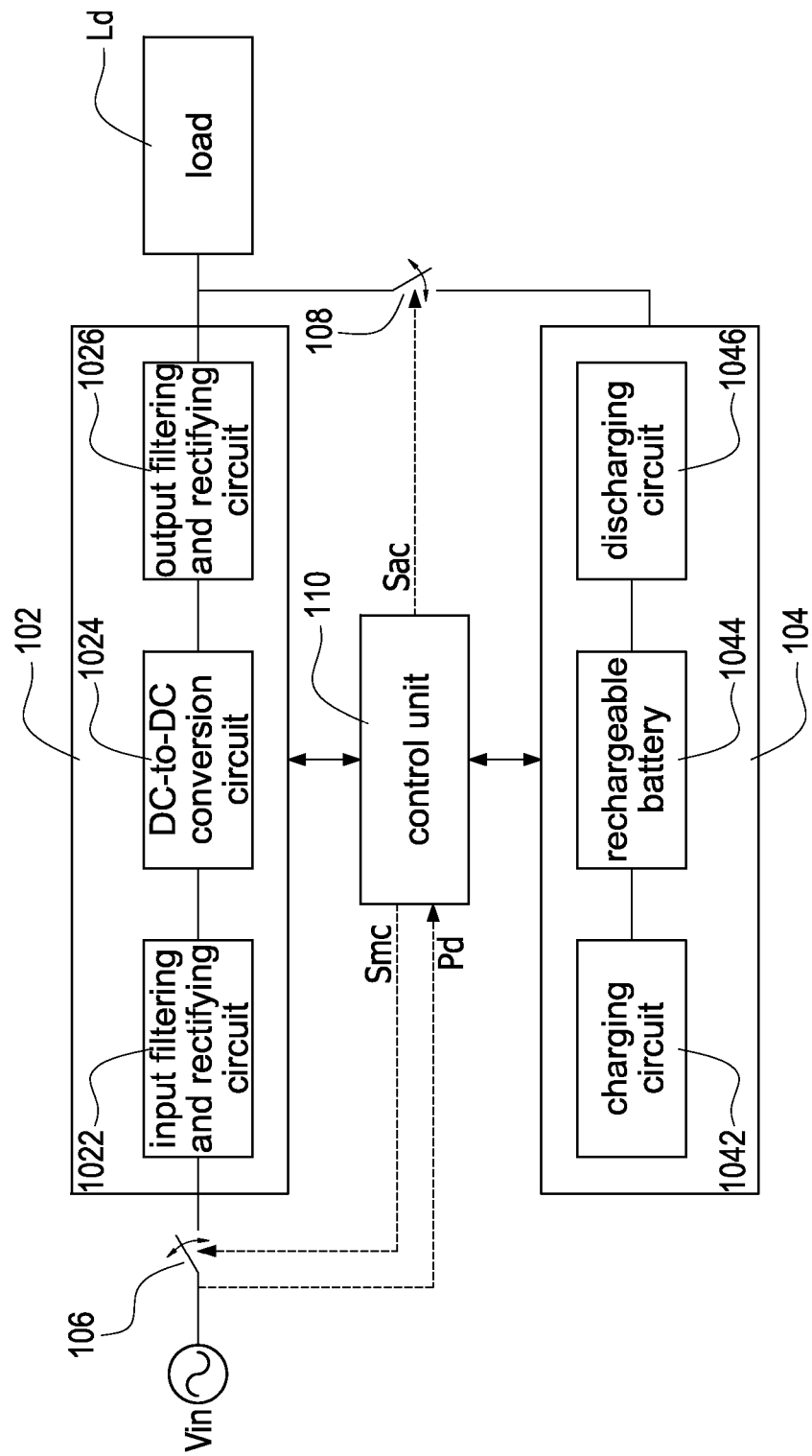
FIG. 5 is a schematic block diagram of the power supply conversion system according to a fourth embodiment of the present disclosure.

Reference is made to FIG. 5 which is a schematic block diagram of the power supply conversion system according to a fourth embodiment of the present disclosure. The main power apparatus 102 includes an input filtering and rectifying circuit 1022, a DC-to-DC conversion circuit 1024, and an output filtering and rectifying circuit 1026. The auxiliary power apparatus 104 includes a charging circuit 1042, a rechargeable battery 1044, and a discharging circuit 1046. When the main switch 106 is turned on, the input filtering and rectifying circuit 1022 receives the external power source Vin and filters and rectifies the external power source Vin. The DC-to-DC conversion circuit 1024 receives a DC voltage outputted from the input filtering and rectifying circuit 1022 and controls voltage levels of the DC voltage. The output filtering and rectifying circuit 1026 filters and rectifies the output voltage of the DC-to-DC conversion circuit 1024 and outputs the required voltage to supply power to the load Ld.

In this embodiment, the auxiliary power apparatus 104 is composed of the rechargeable battery 1044, the charging circuit 1042, and the discharging circuit 1046. When the external power source Vin normally supplies power, the main power apparatus 102 receives the external power source Vin and converts the external power source Vin to supply power to the load Ld. In addition, the external power source Vin further provides power to the auxiliary power apparatus 104 to charge the rechargeable battery 1044 via the charging circuit 1042 to implement the backup function. Once the external power source Vin abnormally supplies power, the auxiliary power apparatus 104 is switched to play a role of supplying power to the load Ld via the discharging circuit 1046 so as to continually supply power to the load Ld in the power supply conversion system 10.

Figure 6:
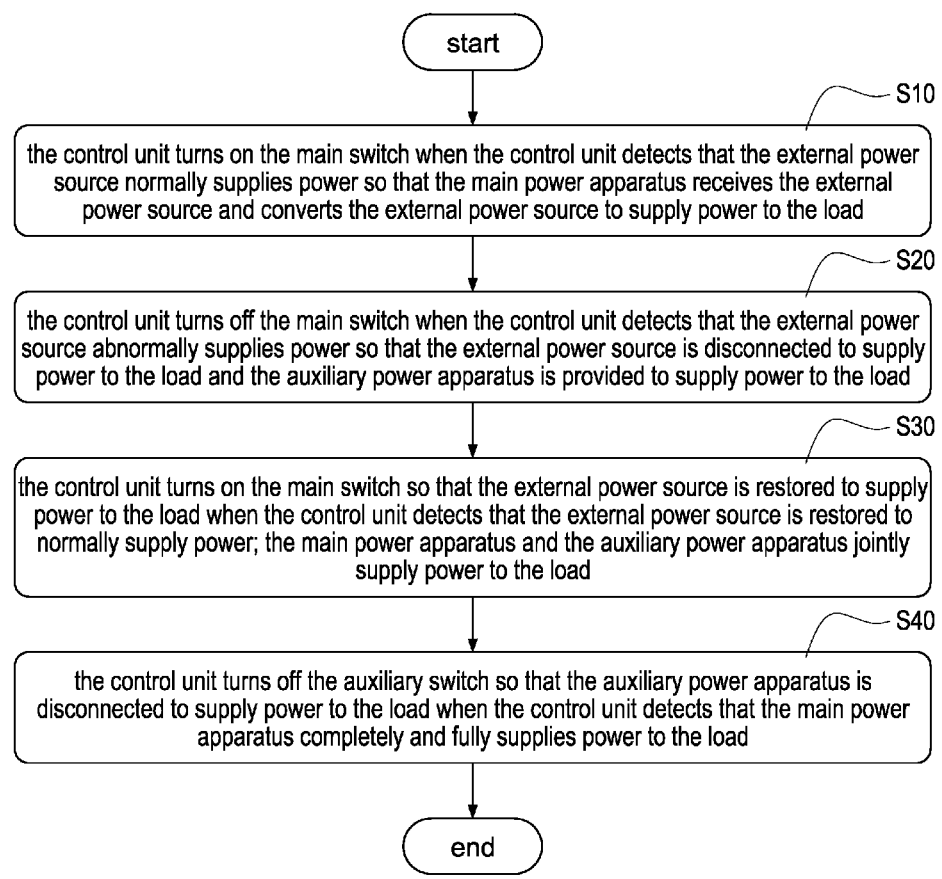
FIG. 6 is a flowchart of a method of controlling the power supply conversion system according to the present disclosure.

Reference is made to FIG. 6 which is a flowchart of a method of controlling the power supply conversion system according to the present disclosure. The power supply conversion system receives an external power source and supplies power to a load. The power supply conversion system includes at least one main power apparatus, at least one auxiliary power apparatus, a main switch, an auxiliary switch, and at least one control unit. The main switch is connected between the external power source and the at least one main power apparatus. The auxiliary switch is connected to the at least one auxiliary power apparatus and the load. The least one control unit is connected to the main power apparatus and the auxiliary power apparatus. The method of controlling the power supply conversion system has following steps. First, the control unit turns on the main switch when the control unit detects that the external power source normally supplies power so that the main power apparatus receives the external power source and converts the external power source to supply power to the load (S10). Afterward, the control unit turns off the main switch when the control unit detects that the external power source abnormally supplies power so that the external power source is disconnected to supply power to the load and the auxiliary power apparatus is provided to supply power to the load (S20). Especially, "the external power source abnormally supplies power" means that the external power source cannot normally provide power because of failure, malfunction, repair of the external power source.

Afterward, the control unit turns on the main switch so that the external power source is restored to supply power to the load when the control unit detects that the external power source is restored to normally supply power. Especially, the main power apparatus and the auxiliary power apparatus jointly supply power to the load (S30). At this time, the main switch and the auxiliary switch are simultaneously turned on. In this operation, the control unit controls that the output voltage of the main power apparatus is greater than the output voltage of the auxiliary power apparatus. Accordingly, the main power apparatus gradually increases the output power to supply the load but the auxiliary power apparatus gradually decreases the output power to supply the load when the main power apparatus and the auxiliary power apparatus jointly supply power to the load. That is, the output current of the main power apparatus gradually increases and the output current of the auxiliary power apparatus gradually decreases. Finally, the control unit turns off the auxiliary switch so that the auxiliary power apparatus is disconnected to supply power to the load when the control unit detects that the main power apparatus completely and fully supplies power to the load (S40).

In conclusion, the present disclosure has following advantages:

1. The power supply conversion system 10 with multiple main power apparatuses, auxiliary power apparatuses, and control units is provided to supply more power to the load Ld, thus increasing stability and reliability of power supply;

2. By extending the time of jointly supplying power to the load Ld by the main power apparatus 102 and the auxiliary power apparatus 104 so that the main power apparatus 102 gradually increases the output power to supply the load Ld but the auxiliary power apparatus 104 gradually decreases the output power to supply the load Ld in the energy switching area, thus softly and smoothly switching the main power apparatus 102 to supply power to the load Ld. Hence, the inrush current generated because of instantaneously disconnecting the auxiliary power apparatus 104 and switching the main power apparatus 102 to supply to the load Ld can be restrained to avoid the voltage dip of the input power source. Further, the conditions of shut down, re-boosting, re-bounce, and damage of the power supply conversion system can be also overcome.

3. By gradually increasing output current of the main power apparatus 102 and decreasing output current of the auxiliary power apparatus 104 in a linear and time-varying control manner, the soft and smooth switching power supply conversion between the main power apparatus 102 and the auxiliary power apparatus 104 and robustness of supplying power to the load Ld can be implemented; and 4. The control unit 110 detects that the external power source Vin normally or abnormally supplies power to the load Ld so that the main power apparatus 102 or/and the auxiliary power apparatus 104 continually supplies power to the load Ld in the power supply conversion system 10.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply conversion system receiving an external power source and supplying power to a load, the power supply conversion system comprising:
    at least one main power apparatus;
    at least one auxiliary power apparatus;
    a main switch connected between the external power source and the main power apparatus;
    an auxiliary switch connected between the auxiliary power apparatus and the load; and
    at least one control unit connected to the main power apparatus and the auxiliary power apparatus;
    wherein
        the control unit is configured to turn on the main switch when the control unit detects that the external power source normally supplies power so that the main power apparatus is configured to receive the external power source and convert the external power source to supply power to the load;
        the control unit is configured to turn off the main switch when the control unit detects that the external power source abnormally supplies power so that the external power source is disconnected to supply power to the load and the auxiliary power apparatus is configured to supply power to the load;
        the control unit is configured to turn on the main switch to restore the external power source so that the main power apparatus converts the external power source to supply power to the load, and simultaneously the control unit is configured to keep turning on the auxiliary switch so that the auxiliary power apparatus is kept to supply power to the load, and therefore the main power apparatus and the auxiliary power apparatus jointly supply power to the load when the control unit detects that the external power source is restored to normally supply power;
        when the main power apparatus and the auxiliary power apparatus jointly supply power to the load, the main power apparatus outputs an output voltage with a first voltage to supply power to the load and the auxiliary power apparatus outputs an output voltage with a second voltage to supply power to the load, and the control unit is configured to control the first voltage of the main power apparatus to gradually increase from less than the second voltage of the auxiliary power apparatus to greater than the second voltage of the auxiliary power apparatus; and the control unit is configured to disconnect the auxiliary power apparatus supplying power to the load when the control unit detects that the main power apparatus completely and fully supplies power to the load.

2. The power supply conversion system in claim 1, wherein the control unit is configured to control that the output voltage of the main power apparatus is greater than the output voltage of the auxiliary power apparatus so that the main power apparatus gradually increases the output power to supply the load but the auxiliary power apparatus gradually decreases the output power to supply the load when the main power apparatus and the auxiliary power apparatus jointly supply power to the load.

3. The power supply conversion system in claim 2, wherein the time of jointly supplying power to the load by the main power apparatus and the auxiliary power apparatus is an energy switching area; the main power apparatus is configured to gradually increase output power to supply power to the load in the energy switching area.

4. The power supply conversion system in claim 3, wherein the control unit is configured to control the main power apparatus gradually increasing fixed percentage of supplying power to the load in the energy switching area.

5. The power supply conversion system in claim 4, wherein the control unit is configured to divide the energy switching area into a plurality of time intervals, and the control unit is configured to control the main power apparatus gradually increasing percentage of supplying power to the load for each time interval.

6. The power supply conversion system in claim 1, wherein the control unit is configured to disconnect the auxiliary power apparatus supplying power to the load when the control unit detects that the main power apparatus completely and fully supplies power to the load, thus softly and smoothly switching the main power apparatus to supply power to the load.

7. The power supply conversion system in claim 1, wherein the main power apparatus includes an input filtering and rectifying circuit, a DC-to-DC conversion circuit, and an output filtering and rectifying circuit; the auxiliary power apparatus includes a charging circuit, a rechargeable battery and a discharging circuit.

8. The power supply conversion system in claim 1, wherein the main switch or the auxiliary switch is a circuit breaker or a power switch.

9. The power supply conversion system in claim 1, wherein the external power source is an AC power source or a DC power source.

10. A method of controlling a power supply conversion system, the power supply conversion system receiving an external power source and supplying power to a load; wherein the power supply conversion system has at least one main power apparatus, at least one auxiliary power apparatus, and at least one control unit; the method comprising following steps:

(a) receiving the external power source and converting the external power source to supply power to the load by the main power apparatus when the control unit detects that the external power source normally supplies power;

(b) disconnecting the external power source and switching the auxiliary power apparatus to supply power to the load by the control unit when the control unit detects that the external power source abnormally supplies power;

(c) restoring the external power source so that the main power apparatus converts the external power source to supply power to the load, and simultaneously the auxiliary power apparatus is kept to supply power to the load by the control unit and jointly supplying power to the load by the main power apparatus and the auxiliary power apparatus when the control unit detects that the external power source is normally restored, wherein when the main power apparatus and the auxiliary power apparatus jointly supply power to the load, the main power apparatus outputs an output voltage with a first voltage to supply power to the load and the auxiliary power apparatus outputs an output voltage with a second voltage to supply power to the load, and the control unit controls the first voltage of the main power apparatus to gradually increase from less than the second voltage of the auxiliary power apparatus to greater than the second voltage of the auxiliary power apparatus; and (d) disconnecting the auxiliary power apparatus supplying power to the load when the control unit detects that the main power apparatus completely and fully supplies power to the load.

11. The method of controlling the power supply conversion system in claim 10, wherein in the step (c), the control unit is configured to control that the output voltage of the main power apparatus is greater than the output voltage of the auxiliary power apparatus so that the main power apparatus gradually increases the output power to supply the load but the auxiliary power apparatus gradually decreases the output power to supply the load when the main power apparatus and the auxiliary power apparatus jointly supply power to the load.

12. The method of controlling the power supply conversion system in claim 10, wherein the power supply conversion system further comprising:

a main switch connected between the external power source and the main power apparatus; and an auxiliary switch connected between the auxiliary power apparatus and the load.

13. The method of controlling the power supply conversion system in claim 12, wherein the control unit is configured to turn on the main switch so that the main power apparatus receives the external power source and converts the external power source to supply power to the load when the control unit detects that the external power source normally supplies power; the control unit is configured to turn off the main switch and disconnect the external power source to supply power to the load when the control unit detects that the external power source abnormally supplies power; the control unit is configured to turn on the main switch to restore the external power source so that the main power apparatus and the auxiliary power apparatus jointly supply power to the load when the control unit detects that the external power source is restored to normally supply power, wherein the control unit is configured to control that the output voltage of the main power apparatus is greater than the output voltage of the auxiliary power apparatus; the control unit is configured to disconnect the auxiliary power apparatus supplying power to the load when the control unit detects that the main power apparatus completely and fully supplies power to the load.

14. The method of controlling the power supply conversion system in claim 13, wherein the control unit is configured to control that the output voltage of the main power apparatus is greater than the output voltage of the auxiliary power apparatus so that the main power apparatus gradually increases the output power to supply the load but the auxiliary power apparatus gradually decreases the output power to supply the load when the main power apparatus and the auxiliary power apparatus jointly supply power to the load.

15. The method of controlling the power supply conversion system in claim 14, wherein the time of jointly supplying power to the load by the main power apparatus and the auxiliary power apparatus is an energy switching area; the main power apparatus is configured to gradually increase output power to supply power to the load in the energy switching area.

16. The method of controlling the power supply conversion system in claim 15, wherein the control unit is configured to control the main power apparatus gradually increasing fixed percentage of supplying power to the load in the energy switching area.

17. The method of controlling the power supply conversion system in claim 16, wherein the control unit is configured to divide the energy switching area into a plurality of time intervals, and the control unit is configured to control the main power apparatus gradually increasing percentage of supplying power to the load for each time interval.

18. The method of controlling the power supply conversion system in claim 10, wherein the control unit is configured to disconnect the auxiliary power apparatus supplying power to the load when the control unit detects that the main power apparatus completely and fully supplies power to the load, thus softly and smoothly switching the main power apparatus to supply power to the load.

19. The method of controlling the power supply conversion system in claim 10, wherein the main power apparatus includes an input filtering and rectifying circuit, a DC-to-DC conversion circuit, and an output filtering and rectifying circuit; the auxiliary power apparatus includes a charging circuit, a rechargeable battery and a discharging circuit.

20. The method of controlling the power supply conversion system in claim 12, wherein the main switch or the auxiliary switch is a circuit breaker or a power switch.

* * * * *